(12) United States Patent
Nye (10) Patent No.: US 10,455,271 B1
(45) Date of Patent: Oct. 22, 2019

(54) VOICE CONTROL COMPONENT INSTALLATION

(71) Applicant: Vivint, Inc., Provo, UT (US)

(72) Inventor: James E. Nye, Alpine, UT (US)

(73) Assignee: Vivint, Inc., Provo, UT (US)

(*) Notice: Subject to any disclaimer, the term of this patent is extended or adjusted under 35 U.S.C. 154(b) by 0 days.

(21) Appl. No.: 16/101,501

(22) Filed: Aug. 12, 2018

Related U.S. Application Data (63) Continuation of application No. 15/583,771, filed on May 1, 2017, now Pat. No. 10,057,620, which is a continuation of application No. 14/272,053, filed on May 7, 2014, now Pat. No. 9,641,885.

(51) Int. Cl.
| | |
|---|---|
| G10L 15/22 | (2006.01) |
| G10L 15/30 | (2013.01) |
| H04N 21/41 | (2011.01) |
| H04N 21/485 | (2011.01) |
| H04N 21/422 | (2011.01) |
| G06F 3/16 | (2006.01) |
| H04N 21/439 | (2011.01) |
| H04N 21/436 | (2011.01) |
| G10L 15/00 | (2013.01) |
| G10L 15/28 | (2013.01) |
| G06F 8/61 | (2018.01) |

(52) U.S. Cl.
CPC ......... *H04N 21/4131* (2013.01); *G06F 3/167* (2013.01); *G06F 8/61* (2013.01); *G10L 15/00* (2013.01); *G10L 15/28* (2013.01); *H04N 21/42203* (2013.01); *H04N 21/4394* (2013.01); *H04N 21/43615* (2013.01); *H04N 21/485* (2013.01); *G05B 2219/35453* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 5,481,714 A | 1/1996 | Pipkin et al. | |
| 6,988,070 B2 * | 1/2006 | Kawasaki | G10L 15/26 704/270 |
| 7,634,504 B2 | 12/2009 | Amundson | |
| 9,019,083 B2 * | 4/2015 | Corsini | G06F 1/1632 340/12.5 |
| 2002/0044042 A1 * | 4/2002 | Christensen | G05B 15/02 340/3.54 |
| 2004/0172256 A1 * | 9/2004 | Yokoi | G01C 21/00 704/275 |
| 2004/0215750 A1 | 10/2004 | Stilp | |

(Continued)

OTHER PUBLICATIONS

2gig Technologies, Go Control Wireless Security System, Installation & Programming Instructions, Intertek, Sep. 12, 2009, 50 pages.

*Primary Examiner* — Shreyans A Patel
(74) *Attorney, Agent, or Firm* — Holland & Hart LLP (57) ABSTRACT

A method for voice control component installation is described. In one embodiment, a speech recognizable input spoken by an installer is identified, the speech recognizable input relating to installation of a system component. The system component is in communication with a control panel. An installation task for the system component is performed according to the speech recognizable input.

17 Claims, 6 Drawing Sheets

(56) References Cited

U.S. PATENT DOCUMENTS

| | | | |
|---|---|---|---|
| 2006/0061817 A1* | 3/2006 | Kakigi | G06F 3/1205 358/1.15 |
| 2006/0092011 A1 | 5/2006 | Simon et al. | |
| 2006/0286930 A1* | 12/2006 | Rathus | H04B 1/082 455/26.1 |
| 2011/0187812 A1* | 8/2011 | Sankai | A61B 5/01 348/14.08 |
| 2012/0011573 A1* | 1/2012 | Menasce | G06F 21/40 726/4 |
| 2012/0203379 A1 | 8/2012 | Sloo et al. | |
| 2012/0231779 A1* | 9/2012 | Rathus | H04B 1/082 455/418 |
| 2013/0132094 A1* | 5/2013 | Lim | G10L 15/22 704/E11.001 |
| 2013/0238326 A1* | 9/2013 | Kim | G06F 3/167 704/231 |
| 2014/0153281 A1 | 6/2014 | Zhao et al. | |
| 2014/0156281 A1* | 6/2014 | Boyd | H04L 12/281 704/275 |
| 2014/0167931 A1 | 6/2014 | Lee et al. | |
| 2014/0188484 A1* | 7/2014 | Huang | G06F 3/0481 704/275 |
| 2014/0207280 A1* | 7/2014 | Duffley | G05D 1/0016 700/257 |
| 2014/0266684 A1 | 9/2014 | Poder et al. | |
| 2014/0330435 A1* | 11/2014 | Stoner | H04L 12/2816 700/275 |
| 2015/0106086 A1 | 4/2015 | Oh et al. | |
| 2015/0294671 A1 | 10/2015 | Oh et al. | |

\* cited by examiner

VOICE CONTROL COMPONENT INSTALLATION

CROSS-REFERENCE TO RELATED APPLICATIONS

The present application is a continuation of U.S. patent application Ser. No. 15/583,771, titled: "Voice Control Component Installation," filed May 1, 2017, which is a continuation of U.S. patent application Ser. No. 14/272,053, titled: "Voice Control Component Installation," filed on May 7, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased capability to monitor homes and offices using building automation and security systems. Presently, each component of building automation and security systems involves an installer manually entering information. Entering this information manually may take considerable time. As a result, benefits may be realized by improving the installation process of automation and security systems.

SUMMARY

According to at least one embodiment, a method for voice control component installation is described. In one embodiment, a speech recognizable input spoken by an installer may be identified, the speech recognizable input relating to installation of a system component. The system component may be in communication with a control panel. An installation task for the system component may be performed according to the speech recognizable input.

In one embodiment, information regarding the system component may be received via the speech recognizable input. For example, a type of the system component may be received via the speech recognizable input. In some cases, a sensor loop number of the system component may be received from the system component, where the system component includes a sensor loop number for each function of the system component. Additionally, or alternatively, a setting of the system component, a serial number of the system component, and a zone type of the system component may be received from the speech recognizable input. In one embodiment, the method may determine whether the specified type matches at least one type from a list of system component types. In some cases, upon determining the system component is associated with a standard, the method may determine whether the setting of the system component complies with the standard.

In one embodiment, the method may include communicatively coupling the control panel with a mobile device and receiving, in conjunction with the control panel, the speech recognizable input in a data communication sent from the mobile device. In some cases, a triggering event generated by the system component may be detected. The method may include receiving, from the system component, information related to the triggering event and verifying the installation of the system component by comparing information received via the speech recognizable input with the information received from the system component.

In one embodiment, the identity of the installer may be authenticated via installer identification information provided via the speech recognizable input. Thus, in some cases, the speech recognizable may include at least a portion of the installer identification information. Upon verifying the installation of the system component, the method may include decrementing the installed system component from an inventory of components associated with the installer. In some embodiments, the installation task may include communicating to the installer information received via the speech recognizable input. For example, upon completing installation of a sensor, the method may include providing information to the installer to enable the installer to verify the information received by the control panel via the speech recognizable input was correctly identified.

A computing device configured for voice control component installation is also described. The device may include a processor and memory in electronic communication with the processor. The memory may store instructions that may be executable by the processor to identify a speech recognizable input spoken by an installer and perform an installation task for the system component according to the speech recognizable input. The speech recognizable input may relate to installation of a system component, the system component being in communication with the control panel.

A computer-program product for voice control component installation is also described. The computer-program product may include a non-transitory computer-readable medium that stores instructions. The instructions may be executable by the processor to identify a speech recognizable input spoken by an installer and perform an installation task for the system component according to the speech recognizable input. The speech recognizable input may relate to installation of a system component, the system component being in communication with the control panel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate generally to installing a security system or a building automation system into a residence or premise of a building. Typically, the process of installing such system is time consuming. An installer mounts a control panel at a selected location within the building. Next, the installer mounts the sensors, video cameras, and other system components throughout the building. Each of these separate sensors and other components need to be tied into the system so that they can communicate with the control panel. One way to tie each sensor into control panel is to manually input a sensor identifier number, sensor configurations, and other information into the control panel for the sensor to make a connection with the control panel. After inputting the appropriate information into the control panel, the installer may verify that the sensor is properly integrated into the security or automation system.

One aspect of the systems and methods described herein relates to systems, methods and related devices to reduce the system's installation time. This may be accomplished by implementing speech control into the control panel thereby saving the installer the time that it would otherwise take for the installer to manually type the desired information into the control panel. In one implementation, when the installer proceeds to integrate a sensor into the security or automation system, the installer can speak the sensor's identification number and other configuration settings into the control panel in response to appropriate prompts from the control panel. In some examples, a sensor may be used in multiple ways within the security or automation system. In such examples, even if the panel was able to identify the type of sensor based on the sensor's identification number, the control panel may not be able to make assumptions about how the sensor is being used. Such configuration settings for that sensor may be spoken to the control panel.

In some examples, the control panel has an ability to speak back to the installer. Such audible communications from the control panel may include messages that prompt the installer on which information to provide next in the installation process. In other examples, such audible messages may include verifications that ensure that the installer is aware that a particular configuration is outside of typical operating parameters. In such circumstances, the installer may give an audible override command. However, in other examples, the control panel will refuse to allow the user to set the configuration outside of the typical operating parameters.

The speech commands can also be used to navigate through the installation process. For example, the installer may give an audible command requesting to install a particular type of sensor, to skip a particular installation step, to view system information while continuing with an installation step, or to navigate to other steps or information related to installing. In some embodiments, the speech commands can be used to fix problems at a time after the system's installation is considered finished.

Further, the system may include verification that the installer is authorized to perform installation tasks. The verification may include receiving a passcode from the installer. In other cases, the speech recognition may be enabled based on the control panel's recognition of the installer's voice.

Figure 1:
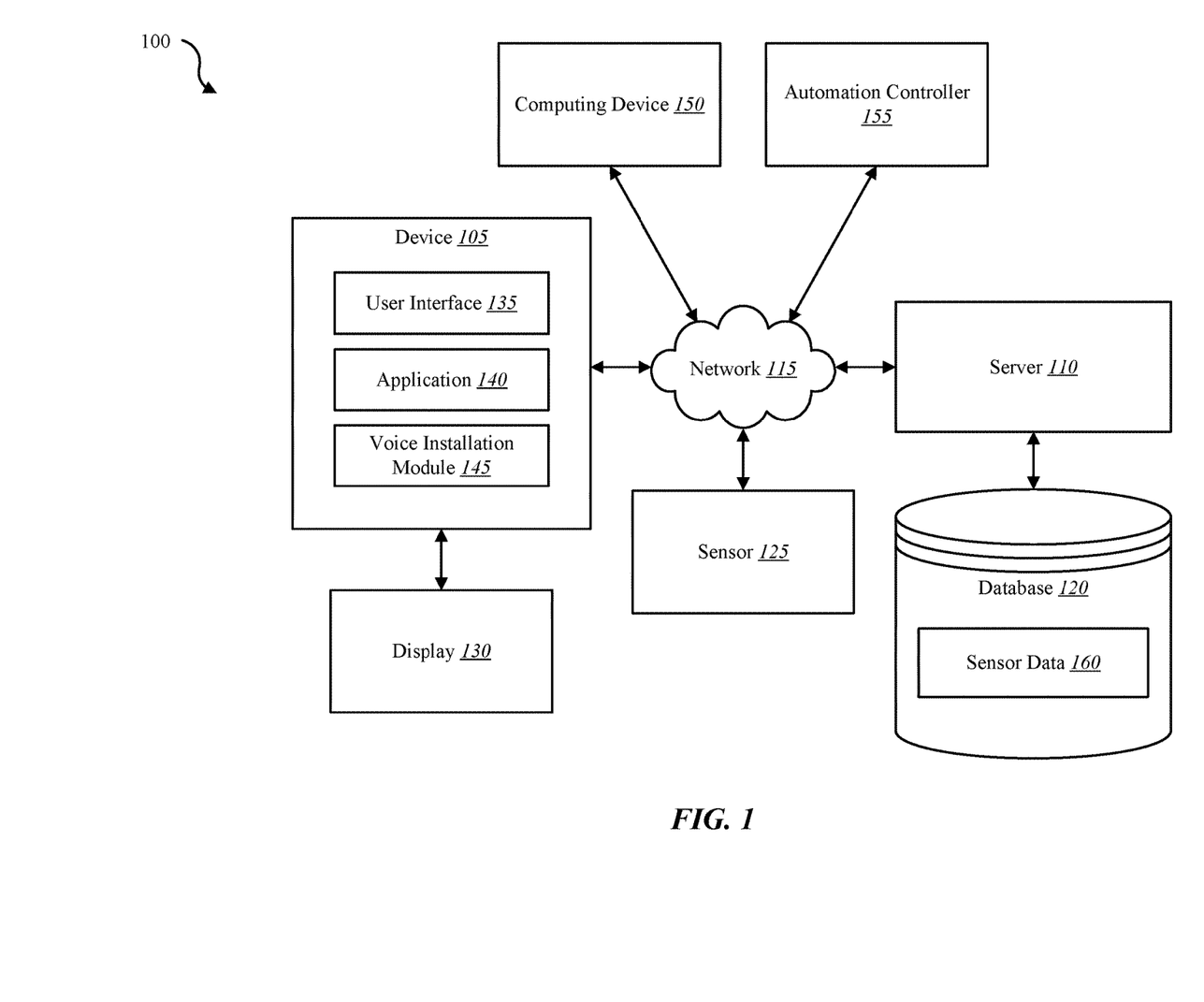
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be at least partially performed on a device (e.g., device 105). The environment 100 may include a device 105, server 110, a sensor 125, a display 130, a computing device 150, a home automation controller 155, and a network 115 that allows the device 105, the server 110, the computing device 150, home automation controller 155, and sensor 125 to communicate with one another via wired and/or wireless communication. Examples of device 105 include control panels (e.g., automation control panel, security control panel, etc.), mobile devices, smart phones, personal computing devices, computers, servers, etc. Examples of computing device 150 include smart phones, tablet computing devices, laptops, desktops, servers, etc. In some cases computing device 150 may be any computing device containing at least one processor, memory, and a microphone. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like.

Examples of sensor 125 include a camera sensor, audio sensor, proximity sensor, boundary sensor, light beam sensor, three-dimensional (3-D) sensor, motion sensor, door sensor, window sensor, accelerometer, global positioning system (GPS) sensor, Wi-Fi positioning system sensor, capacitance sensor, radio frequency sensor, near-field sensor, voice sensor, and the like. Sensor 125 may represent one or more separate sensors or a combination of two or more sensors in a single device. For example, sensor 125 may represent one or more camera sensors and one or more motion sensors connected to the devices of environment 100 and/or network 115. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105 and/or other devices of environment 100.

Additionally, or alternatively, sensor 125 may be integrated with a home appliance or fixture such as a light bulb fixture. Sensor 125 may include an accelerometer to enable sensor 125 to detect a movement. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to detect the proximity of a person relative to an object to which the sensor is attached and/or an area to which the sensor associated.

In some configurations, the device 105 may include a user interface 135, application 140, and voice installation module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, voice installation module 145, computing device 150, home automation controller 155, and/or server 110.

In some embodiments, device 105 may communicate with server 110 via network 115. Examples of networks 115 include cloud networks, local area networks (LAN), wide area networks (WAN), virtual private networks (VPN), wireless networks (using 802.11, for example), cellular networks (using 3G and/or LTE, for example), mesh networks, short-range wireless networks (e.g., Z-WAVE®, ZIGBEE®, BLUETOOTH® Low Energy, etc.), and the like. In some configurations, the network 115 may include the internet.

It is noted that in some embodiments, the device 105 may not include a voice installation module 145. For example, device 105 may include application 140 that allows device 105 to interface with home automation controller 155 via voice installation module 145 located on another device such as computing device 150 and/or server 110. In some embodiments, device 105, home automation controller 155, and server 110 may include at least a portion of voice installation module 145 where at least a portion of the functions of voice installation module 145 are performed separately and/or concurrently on device 105, home automation controller 155, computing device 150, and/or server 110. Likewise, in some embodiments, a user may access the functions of device 105 and/or home automation controller 155 (directly or through device 105 via voice installation module 145) from computing device 150. For example, in some embodiments, computing device 150 includes a mobile application that interfaces with one or more functions of device 105, home automation controller 155, voice installation module 145, and/or server 110. In some embodiments, at least a portion of the functions of the voice installation module 145 may execute in association with on one or more devices located in a cloud network, including any one of the devices illustrated in FIG. 1. In one example, one or more computing devices may connect to and communicate with a home automation controller in a home over a cloud network. Thus, one or more functions of the voice installation module 145 may be performed on one or more devices in a cloud network. Performance of the function by the one or more devices in the cloud network may include interacting, controlling an aspect of, and/or communicating with one or more devices in the home via the home automation controller 155.

In some embodiments, server 110 may be coupled to database 120. Database 120 may include sensor data 160. Sensor data 160 may include information related to sensor settings, sensor standards, sensor identification, sensor equipment lists, and other related sensor information. As depicted, device 105 may access sensor data 160 in database 120 over network 115 via server 110. Database 120 may be internal or external to the server 110. Additionally, or alternatively, sensor data 160 may be stored locally at the device 105, on a computing device 150, and/or home automation controller 155. In one example, device 105, computing device 150, and/or home automation controller 155 may be coupled directly to database 120, database 120 being internal or external to device 105, computing device 150, and/or home automation controller 155.

In one embodiment, voice installation module 145 may enable an installer to install one or more system components using speech recognizable input. For example, voice installation module 145 may enable an installer to install a motion detector, a smoke detector, an image sensor, a door/window sensor, and the like, using voice commands to provide a control panel information regarding the sensors that are being installed. Thus, in one embodiment, a speech recognizable input may be received by voice installation module 145. Voice installation module 145 may receive and process at least a portion of the information from the speech recognizable input. In some configurations, at least a portion of the information from the speech recognizable input may be sent by the voice installation module 145 to computing device 150, automation controller 155, and/or server 110, via network 115. In some cases, automation controller 155 and/or computing device 150 may receive and process at least a portion of speech recognizable input. Thus, the speech recognizable input may be received directly at automation controller 155. The automation controller 155 may send at least a portion of the received speech recognizable input to device 105, computing device 150, and/or server 110. In one embodiment, the speech recognizable input may be received directly at the computing device 150, where the computing device 150 may send at least a portion of the speech recognizable input to device 105, automation controller 155, and/or server 110. Further details regarding the voice installation module 145 are provided below.

Figure 2:
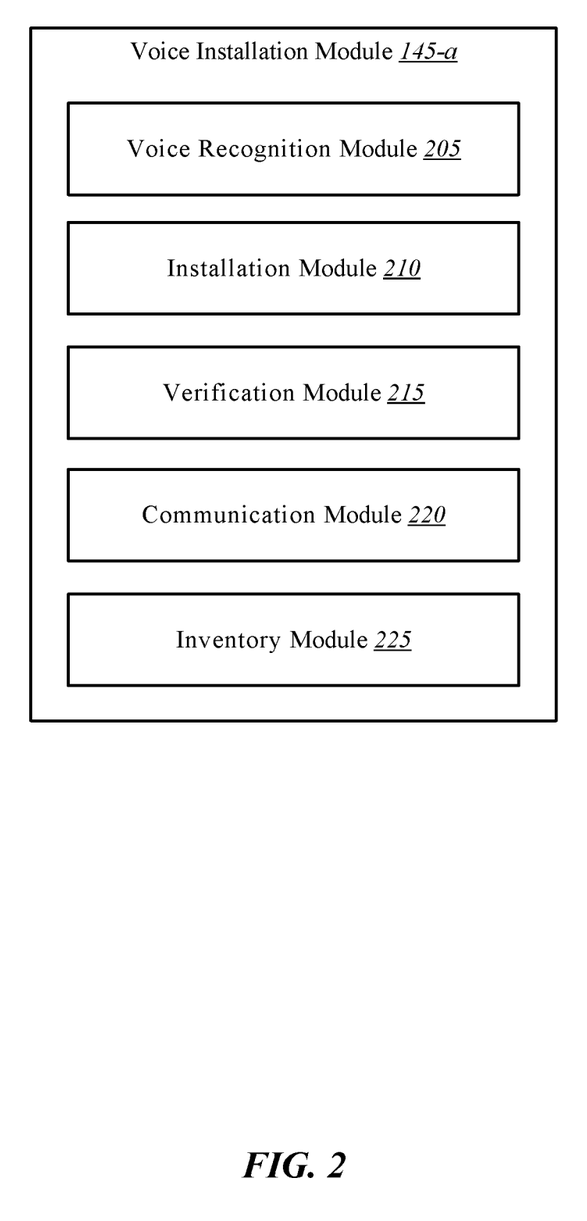
FIG. 2 is a block diagram illustrating one example of a voice installation module.

FIG. 2 is a block diagram illustrating one example of a voice installation module 145-a. Voice installation module 145-a may be one example of voice installation module 145 depicted in FIG. 1. As depicted, voice installation module 145-a may include voice recognition module 205, installation module 210, verification module 215, communication module 220, and inventory module 225.

In one embodiment, voice recognition module 205 may identify a speech recognizable input spoken by an installer. The speech recognizable input may relate to installation of a system component. For example, an installer may provide speech recognizable input into a microphone of a control panel (e.g., speaking commands into the microphone). In some cases, the system component being installed may be in communication with a control panel. For example, the system component may be configured to communicate with the control panel via wired communication and/or wireless communication. In some embodiments, installation module 210 may perform an installation task for the system component according to the speech recognizable input. In some cases, voice recognition module 205 may allow the installer to navigate a user interface using voice commands. As one example, the installer may cause the control panel to enter a sensor installation mode by stating commands such as "Enter system configuration," "Initiate sensor programming," "Initiate sensor installation," "Initiate Z-wave programming," "Add a new sensor," "Modify an existing sensor," and so forth. The installer may then provide one or more additional voice commands to install and/or configure one or more sensors. The control panel may provide one or more prompts via information displayed on a screen and/or information provided via text-to-speech and a speaker. For example, the control panel may request the installer provide specific information regarding a sensor. In one example, the control panel may request the installer provide information regarding a zone, a zone type, a sensor type, a sensor serial number, and so forth.

Upon entering a system configuration mode, the installer may provide, in conjunction with voice recognition module 205 and a control panel, information regarding a system component. It is noted that the term "sensor" may be used interchangeably with the term "system component." Also, the terms "installing a sensor" and "configuring a sensor" may refer to "enrolling a sensor in a control panel." In one example, via one or more speech recognizable inputs, voice recognition module 205 may receive and identify a sensor to a zone (e.g., 01-48), a zone type to the zone (e.g., 01=primary entry/exit, 02=secondary entry/exit, 03=perimeter zone, 04=interior follower, etc.), and a sensor equipment type (e.g., 02=motion, 03=glass break, etc.). Additionally, or alternatively, via one or more speech recognizable inputs, voice recognition module 205 may receive and identify a sensor equipment code (e.g., 0869=VIVINT® image sensor, 0872=VIVINT® smoke detector, etc.), an equipment type (e.g., 01=contact, etc.), a sensor serial number (e.g., a globally-unique identifier (GUID), etc.), and a sensor loop number (e.g., 01=sensor loop 1, 02=sensor loop 2, etc.).

Additionally, or alternatively, via one or more speech recognizable inputs, voice recognition module 205 may receive and identify a sensor age (e.g., 00=new, 01=used), a sensor dialer delay (e.g., 00=disable, 01=enable, where, if enabled, provides a communication delay to a monitoring entity and allows a subscriber time to avoid a false alarm transmission), and a sensor voice descriptor (e.g., predetermined, selectable text-to-voice sensor descriptions stored in association with a control panel such as specifying 208 for "smoke" and 052 for "detector"). In some embodiments, via one or more speech recognizable inputs, voice recognition module 205 may receive and identify sensor reports (e.g., 00=disabled, 01=enabled, where, if enabled, provides sensor information to a monitoring entity), sensor supervision settings (e.g., 00=disabled, 01=enabled, where, if enabled, provides a monitoring entity access to control one or more aspects of the sensor), and/or sensor chime settings (00=disable, 01-13=enabled, and allows selection of one or more voice and/or chime to sound on a control panel when sensor is triggered). In some cases, via one or more speech recognizable inputs, voice recognition module 205 may test a system configuration, test a component installation, update a list of installed equipment, and/or send an updated equipment list to monitoring entity.

Accordingly, in one embodiment, voice recognition module 205 may be configured to identify information contained in the speech recognizable input that relates to the system component being installed. In one configuration, voice recognition module 205 may identify a type of the system component from the speech recognizable input. The "type" of system component may refer to a sensor equipment type (e.g., motion detector, security camera, smoke detector, carbon monoxide detector, window/door sensor, glass break sensor, thermostat, lighting control, power outlet control, automated door lock, etc.), a sensor equipment code (VIVINT® image sensor, VIVINT® smoke detector, etc.), a sensor age (new, used, etc.), and the like. In one embodiment, verification module 215 may determine whether the specified type matches at least one type from a list of system component types. For example, verification module 215 may access a database of known system component types and compare the received type to a list of one or more known system component types. Upon detecting a match, verification module 215 may allow the installation to proceed. Upon detecting no match, verification module 215 may trigger communication module 220 to generate a notification that the type received via the speech recognizable input does not match an existing system component type.

In one embodiment, voice recognition module 205 may identify a setting of the system component from the speech recognizable input. The setting of the system component may include one or more programmable attributes such as countdown timers, exit/entry delays, and other configurable rules and settings associated with the system component. The system component may be associated with one or more standards. Upon determining the system component is associated with a standard, verification module 215 may determine whether the identified setting of the system component complies with the standard. For example, an installer may place a sensor on the outside of a main entry/exit door, assigning an exterior zone classification to the sensor. By default, the sensor may be configured to trigger an alarm 30 seconds after detecting an opening of the main door. The installer may adjust this alarm-delay setting, via one or more speech recognizable inputs, to be more or less than 30 seconds. For example, the installer may adjust the alarm-delay setting to be 20 seconds. Accordingly, upon receiving the type of sensor via a speech recognizable input, verification module 215 may determine whether the identified type of sensor is associated with a particular standard. Upon determining the sensor is associated with a standard, verification module 215 may determine whether a setting made via a speech recognizable input complies with the standard. Upon determining a setting made via a speech recognizable input does not comply with a standard, verification module 215 may trigger communication module 220 to generate a notification that a setting received via the speech recognizable input does not comply with a particular standard.

In one embodiment, voice recognition module 205 may identify a serial number of the system component from the speech recognizable input. In some cases, the serial number may include a predetermined number of alphanumeric characters that is unique to a particular device. For instance, a serial number of "VIV-0341" may be a serial number for a particular smoke detector. Each of the smoke detectors may include the same serial number "VIV-0341." In some cases, the system component may be assigned a GUID via the speech recognizable input, where each sensor, even of the same type and make, is assigned an identifier that uniquely identifies that particular sensor among all other sensors.

In one embodiment, voice recognition module 205 may identify a zone type of the system component from the speech recognizable input. The zone type provided via the speech recognizable input may include a zone (e.g., 0-48) as well as a zone type (e.g., 01=primary entry/exit, 02=secondary entry/exit, 03=perimeter zone, etc.). In some embodiments, voice recognition module 205 may identify a sensor loop number of the system component from the speech recognizable input. The system component may include one sensor loop number for each function of the system component. As an example, a smoke detector may include at least three functions. Accordingly, the smoke detector may include at least three sensor loops, such as a smoke sensor loop, a temperature sensor loop, and a freeze sensor loop. Loop 1 may indicate a triggering of the smoke sensor, loop 2 may indicate a triggering of the temperature sensor, and loop 3 may indicate a triggering of the freeze sensor. When the smoke detector is triggered and communicates data to a control panel, the control panel may receive information identifying the smoke detector. In some cases, the information received may include a loop number indicating which of the sensor loops of the smoke detector triggered the alert. Thus, if the smoke sensor detected smoke the data may indicate that loop 1 triggered the alert, and so forth.

In one embodiment, communication module 220 may communicatively couple a control panel with a mobile device (e.g., smart phone, tablet computer, etc.). For example, communication module 220 may use a communication ability of the control panel (e.g., cellular, WiFi wireless, BLUETOOTH®-extended voice, low-powered wireless, etc.) to link the control panel to a smart phone. Thus, the installer may speak the speech recognizable input into the smart phone and the smart phone, in conjunction with communication module 220, may relay the speech recognizable input to a control panel. Accordingly, communication module 220 may be configured to identify a speech recognizable input included in a data communication sent from the mobile device to a control panel. In some cases, communication module 220 may communicate a prompt generated at the control panel to the mobile device. Thus, a control panel may generate a text prompt and/or a text-to-speech prompt in relation to installing a system component. The control panel, in conjunction with communication module 220, may communicate the prompt to a mobile device used by the installer. For example, the control panel may generate a text prompt such as "Enter the sensor serial number." The communication module 220 may communicate this prompt from the control panel to the mobile device by displaying the text prompt "Enter the sensor serial number" on the screen of the mobile device. Additionally, or alternatively, communication module 220 may communicate the prompt by converting the text-based prompt to speech using a text-to-speech algorithm in order to audibly communicate the prompt as machine-generated speech on a speaker of the mobile device. Accordingly, the installer may respond to the prompt by speaking a speech recognizable input into the mobile device.

In one embodiment, communication module 220 may detect a triggering event generated by the system component. For example, a motion detector may be configured to detect motion-based triggering events and to communicate data indicating such triggered events. Accordingly, communication module 220 may receive, from the system component, information related to the triggering event (e.g., motion was detected). In some cases, verification module 215 may be configured to verify the installation of the system component by comparing information identified via the speech recognizable input with the information received from the system component. For instance, an installer may provide a serial number "VIV-0341" for a sensor being installed. The installer may trigger the sensor in order to cause the sensor to communicate data to the control panel. The verification module 215 may then determine whether VIV-0341 matches the serial number communicated by the triggered sensor. In some cases, the verification module 215 may display the information sent by the triggered sensor on a display (e.g., control panel screen, mobile device screen, etc.). The installer may visually inspect the data sent by the triggered sensor to determine whether the information received via the one or more speech recognizable inputs matches the data communicated by the triggered sensor. In one embodiment, communication module 220 may communicate to the installer information received via the speech recognizable input. For example, the installer may request information regarding the installed system component be displayed (e.g., on a control panel screen, mobile device screen, etc.), allowing the installer to verify the one or more speech recognizable inputs received.

Figure 3:
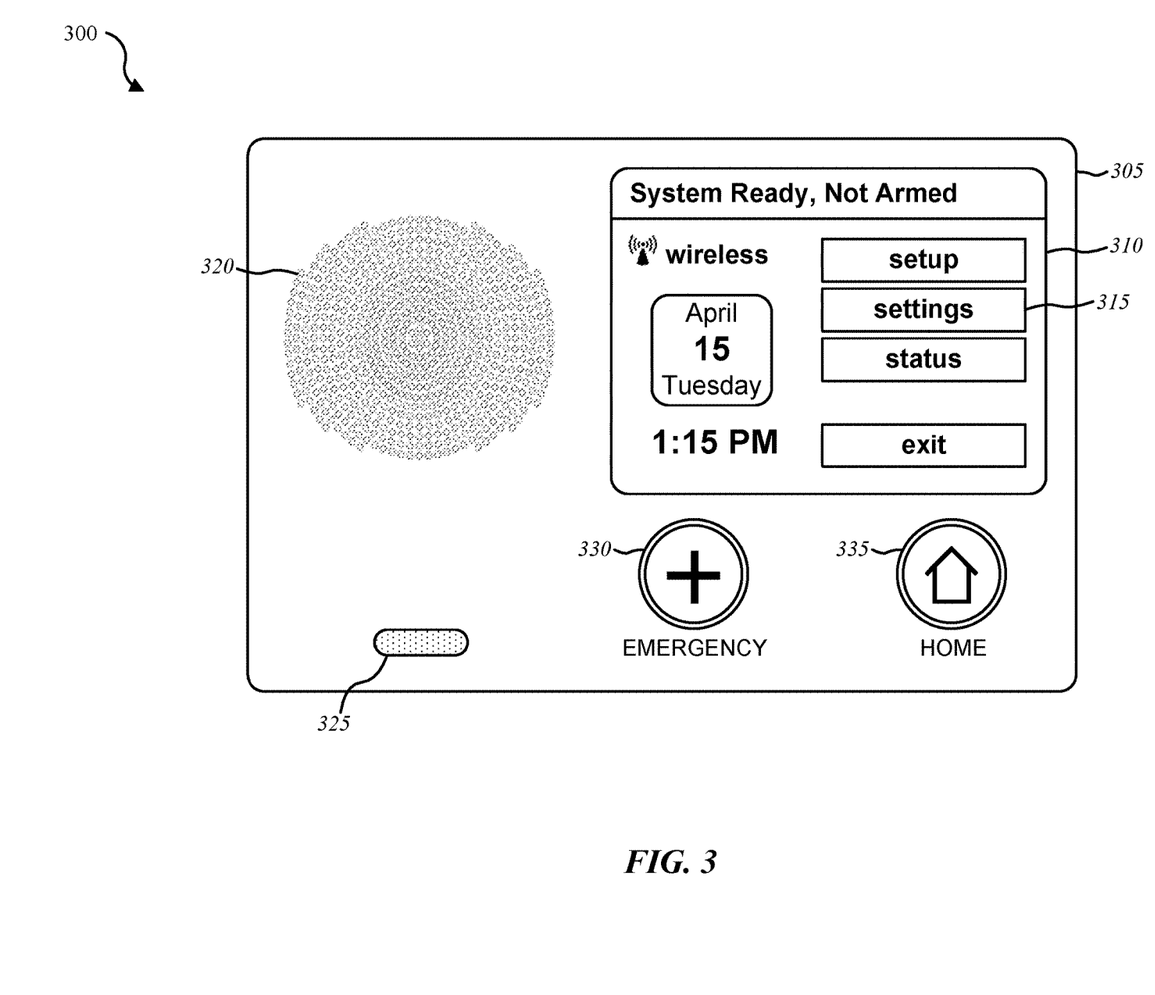
FIG. 3 is a block diagram illustrating one example of an environment for installing a component using voice commands.

In one embodiment, verification module 215 may authenticate the installer via installer identification information. In some cases, the installer identification information may include a company ID, an employee ID, a badge number, a passcode, and the like. In one configuration, the verification module 215 may verify whether the voice of the installer matches a stored voice-print or voice sample associated with the installer. Thus, the speech recognizable input may include at least a portion of the installer identification information. Upon verifying the installation of the system component, inventory module 225 may decrement the installed system component from an inventory of components associated with the installer. For example, a company for which the installer is employed may assign an inventory of 20 motion detectors, 15 smoke detectors, and 10 image sensors to the installer. Upon detecting the installation of 2 motion detectors, 1 smoke detector, and 1 image sensor, inventory module 225 may decrement the installed components from the installer's inventory, leaving 18 motions detectors, 14 smoke detectors, and 9 image sensors in the installer's inventory FIG. 3 is a block diagram illustrating one example of an environment 300 for installing a component using voice commands in conjunction with a control panel 305. In some configurations, functions described with relation to environment 300 may be implemented by the voice installation module 145 illustrated in FIGS. 1 and/or 2. In some configurations, the functions may be implemented in conjunction with the application 140 and/or the user interface 135 illustrated in FIG. 1.

As illustrated, environment 300 includes a display 310 that may be operated in accordance with embodiments of the present disclosure. As shown in FIG. 3, the display 310 may display a user interface 315. User interface 315 may be one example of user interface 135 of FIG. 1. In accordance with some embodiments of the present disclosure, the user interface 315 may include a view presented by software, firmware, or other components stored on computer readable media in the control panel 305, or otherwise accessible thereto. The user interface 315 may be used to display information relevant to operation of the control panel 305 and/or components or devices connected thereto.

In the illustrated embodiment, the user interface 315 may generally represent an interactive interface in which various options are available to a user. As depicted, the home user interface 315 may display information such as a date and time, a status of a security system, and the like. In other embodiments, different or additional information may be provided. For instance, the user interface 315 may change as a user selects different options. If the user wanted to return to a home screen of user interface 315, the user may select a corresponding home option. The illustrated embodiment includes, for instance, a home button 335 that, when depressed or touched, may cause the display 310 to return to a home screen mode associated the user interface 315.

One or more other buttons or elements may be provided to display or provide other interfaces. As an example, the illustrated control panel 305 may also include an emergency button 330. When such a button is touched or depressed, the control panel 305 may display a corresponding emergency interface (not shown) on the display 310. In some cases, pressing the emergency button 330 may cause the control panel 305 to contact a remote party such as an emergency response provider (e.g., police, fire, medical, hospital, etc.) or a network operations center. One or two-way communication with a remote provider may be facilitated by speaker 320 and microphone 325 as well as by communication systems (e.g., telephone connections, wireless communication, voice over internet protocol (VOIP), etc.) in conjunction with the control panel 305. Thus, communication may occur using the control panel 305 and/or an alarm may be sounded. The speaker 320 may communicate an audible prompt to an installer. For example, the speaker 320 may communicate a sound, a chime, recorded speech, and/or text-to-speech to prompt an installer programming an automation/security system in conjunction with control panel 305. In some cases, speaker 320 and microphone 325 may work in conjunction with an intercom system.

In some embodiments, the home user interface 315 may allow a user to select various modes of operation such as a setup mode, an installation mode, a programming mode, a settings mode, a status mode, and the like. As illustrated, such selections may be made by using one or more buttons of user interface 315, a keypad, or the like. Additionally, or alternatively, such selections may be made by speech recognizable input provided by an installer. For instance, an installer may speak into microphone 325 and provide a voice command such as "Control Panel, enter programming mode," and so forth. User interface 315 may respond such selections via on-screen textual responses displayed on display 310 and/or audio responses communicated via speaker 320. Accordingly, an installer may provide one or more speech recognizable inputs to control panel 305 in order to install one or more system components in an automation/security system.

Figure 4:
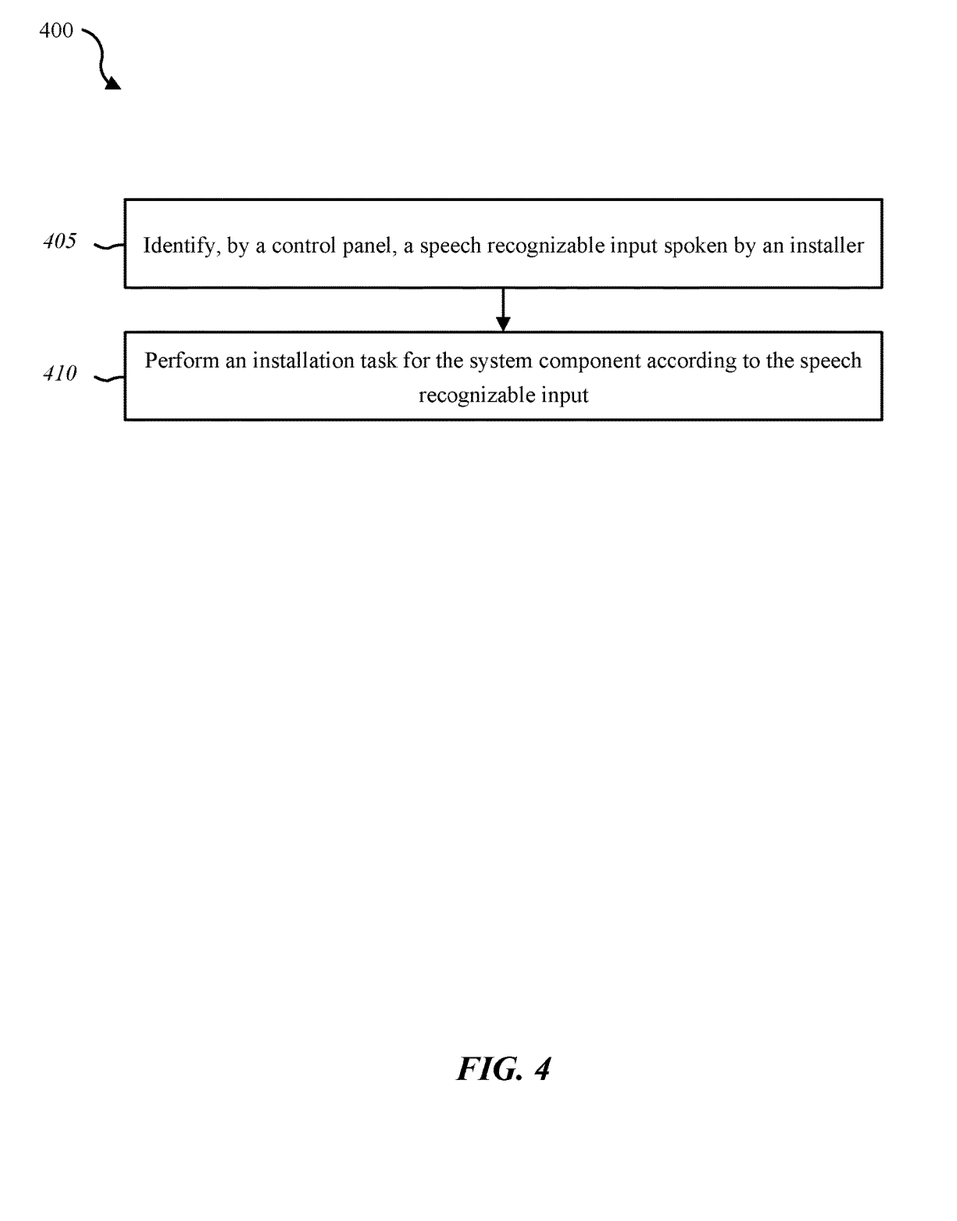
FIG. 4 is a flow diagram illustrating one embodiment of a method for voice control component installation.

FIG. 4 is a flow diagram illustrating one embodiment of a method 400 for voice control component installation. In some configurations, the method 400 may be implemented by the voice installation module 145 illustrated in FIGS. 1 and/or 2. In some configurations, the method 400 may be implemented in conjunction with the application 140 and/or the user interface 135 illustrated in FIG. 1.

At block 405, a speech recognizable input spoken by an installer may be identified by a control panel. The speech recognizable input may relate to installation of a system component. In some cases, the system component may be in communication with the control panel. In one embodiment, the speech recognizable input may include information relating to the system component. For example, the speech recognizable input may include information relating to a type of the system component, a setting of the system component, a serial number of the system component, a zone type of the system component, and the like. In some cases, the speech recognizable input may include information relating to a sensor loop number of the system component, where the system component includes a sensor loop number for each function of the system component. At block 410, an installation task for the system component may be performed according to the speech recognizable input.

Figure 5:
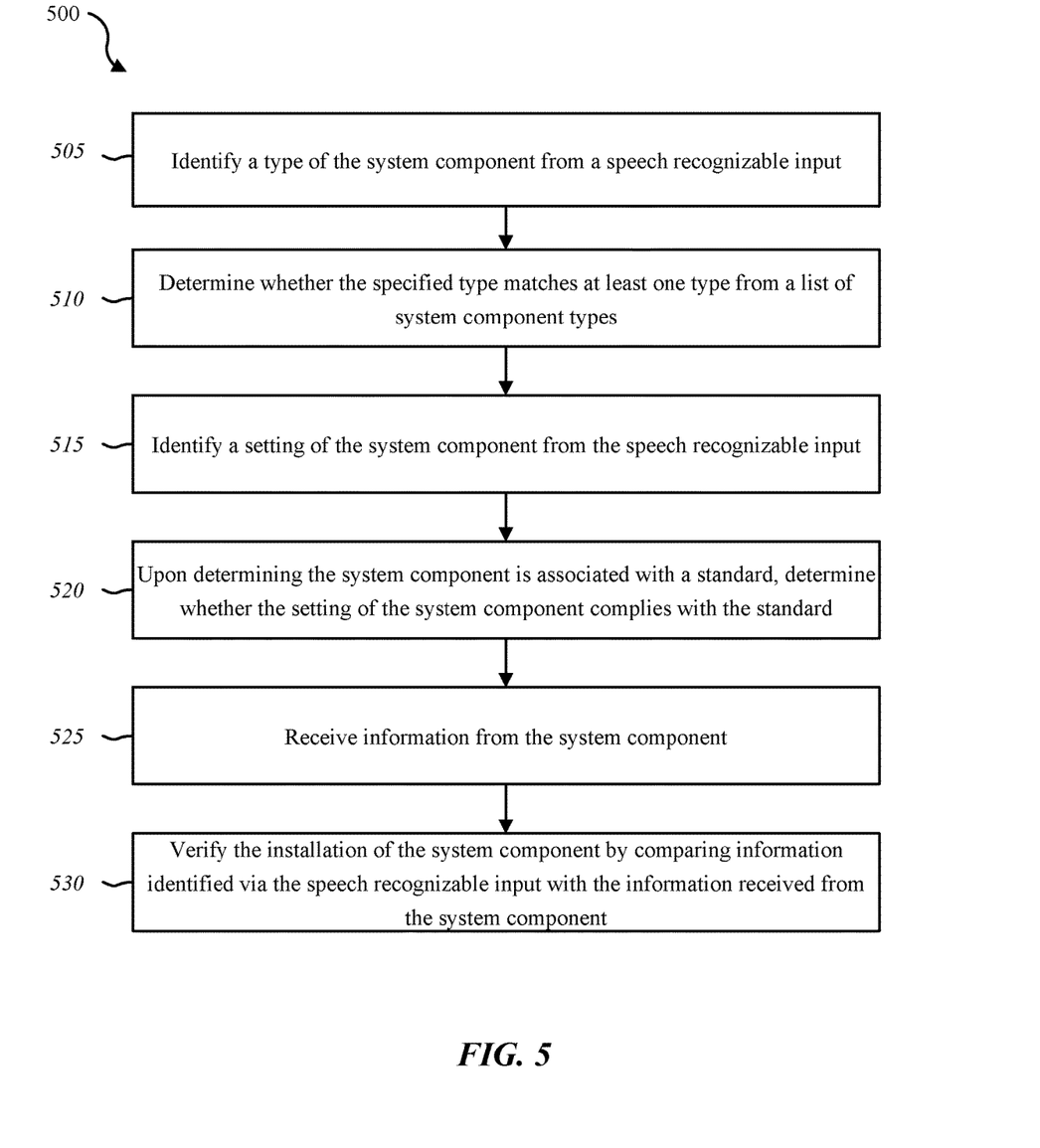
FIG. 5 is a flow diagram illustrating one embodiment of a method for voice control component installation.

FIG. 5 is a flow diagram illustrating one embodiment of a method 500 for voice control component installation. In some configurations, the method 500 may be implemented by the voice installation module 145 illustrated in FIGS. 1 and/or 2. In some configurations, the method 500 may be implemented in conjunction with the application 140 and/or the user interface 135 illustrated in FIG. 1.

At block 505, a type of the system component may be idenfitied from a speech recognizable input. At block 510, it may be determined whether the specified type matches at least one type from a list of system component types. For example, in one case, the control panel may determine whether the specified type matches at least one type from a list of system component types. Additionally, or alternatively, the control panel may send at least a portion of the speech recognizable input to a server and the server may determine whether the specified type matches at least one type from a list of system component types. At block 515, a setting of the system component may be identified from the speech recognizable input. At block 520, upon determining the system component is associated with a standard, it may be determined whether the setting of the system component complies with the standard. In some cases, a control panel may determine whether the setting of the system component complies with the standard. Additionally, or alternatively, a server may determine whether the setting of the system component complies with the standard. At block 525, information from the system component may be received. For example, a control panel may receive information from the system component. At block 530, the installation of the system component may be verified by comparing information identified via the speech recognizable input with the information received from the system component.

Figure 6:
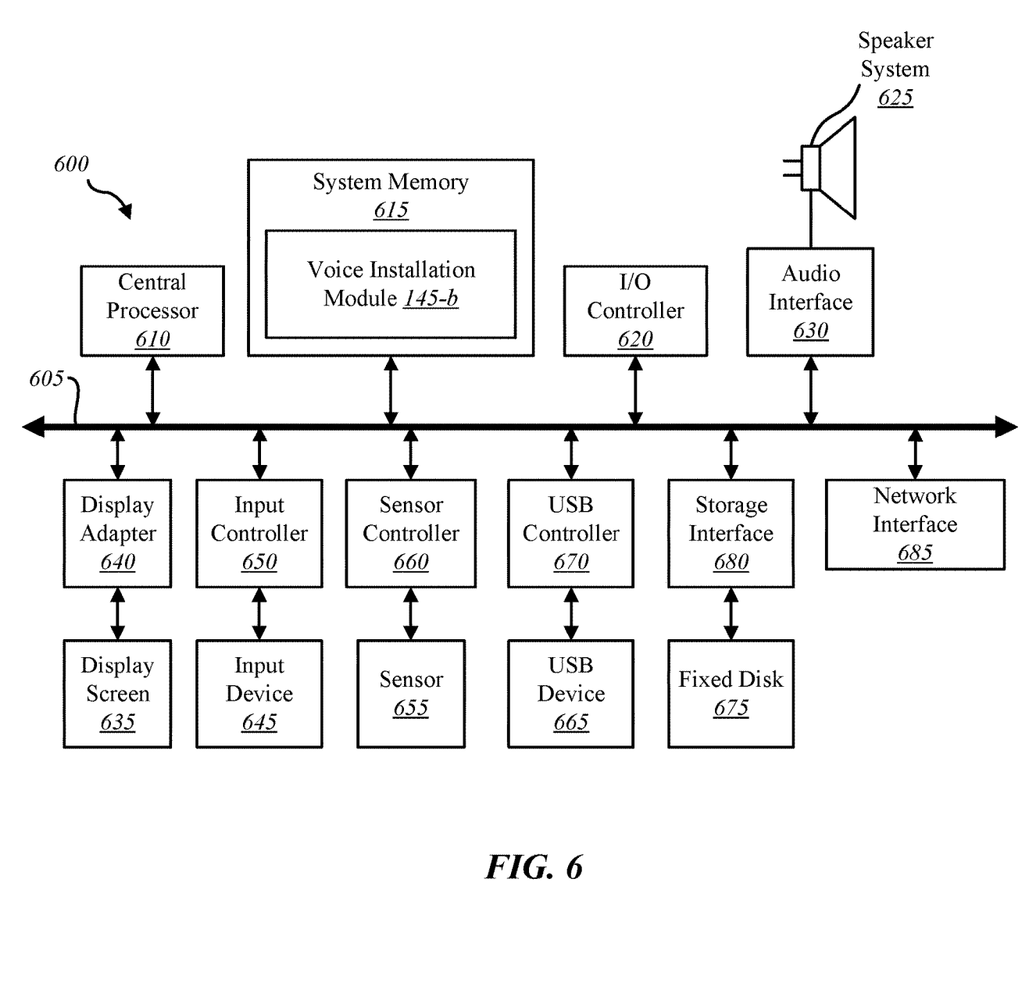
FIG. 6 depicts a block diagram of a computer system suitable for implementing the present systems and methods.

FIG. 6 depicts a block diagram of a controller 600 suitable for implementing the present systems and methods. The controller 600 may be an example of the set top box device 105, computing device 150, and/or home automation controller 155 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the voice installation module 145-b to implement the present systems and methods may be stored within the system memory 615. Applications resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for installing a security or automation system, comprising:
    receiving an audible input from a user;
    identifying an installation command associated with a system component and a setting of the system component based at least in part on the received audible input;
    determining whether the setting complies with a standard associated with the system component, the standard based at least in part on the installation command; and
    determining whether to install the system component based at least in part on determining whether the setting complies with the standard associated with the system component.

2. The method of claim 1, further comprising:
    determining that the identified setting of the system component does not comply with the standard; and
    generating a notification based at least in part on the determining.

3. The method of claim 2, wherein the notification informs the user that the identified setting of the system component does not comply with the standard.

4. The method of claim 1, further comprising:
    identifying one or more configuration parameters of the system component from the audible input;
    comparing the one or more configuration parameters with one or more typical operating parameters; and
    verifying whether the one or more configuration parameters match the one or more typical operating parameters based at least in part on the comparing.

5. The method of claim 4, wherein the one or more configuration parameters comprise at least one of a serial number, zone type, sensor loop, a countdown timer, an exit delay, an entry delay, or a combination thereof.

6. The method of claim 4, further comprising:
determining that the one or more configuration parameters do not match the one or more typical operating parameters based at least in part on the verifying; and
notifying the user that the one or more configuration parameters do not match the one or more typical operating parameters.

7. The method of claim 1, further comprising:
identifying an override command based at least in part on the received audible input;
determining if the system component allows an implementation of the identified override command; and
installing the system component based at least in part on determining that the system component allows the implementation of the identified override command.

8. A system configured for installing a security or automation system, comprising:
a processor;
one or more speakers;
a memory in electronic communication with the processor;
instructions stored in the memory, the instructions being executable by the processor to:
receive an audible input from a user;
identify an installation command associated with a system component and a setting of the system component based at least in part on the received audible input;
determine whether the setting complies with a standard associated with the system component, the standard based at least in part on the installation command; and
determine whether to install the system component based at least in part on determining whether the setting complies with the standard associated with the system component.

9. The system of claim 8, wherein the instructions are executable by the processor to:
determine that the identified setting of the system component does not comply with the standard; and
generate a notification based at least in part on the determining.

10. The system of claim 9, wherein the notification informs the user that the identified setting of the system component does not comply with the standard.

11. The system of claim 8, wherein the instructions are executable by the processor to:
identify one or more configuration parameters of the system component from the audible input;
compare the one or more configuration parameters with one or more typical operating parameters; and
verify whether the one or more configuration parameters match the one or more typical operating parameters based at least in part on the comparing.

12. The system of claim 11, wherein the one or more configuration parameters comprise at least one of a serial number, zone type, sensor loop, a countdown timer, an exit delay, an entry delay, or a combination thereof.

13. The system of claim 11, wherein the instructions are executable by the processor to:
determine that the one or more configuration parameters do not match the one or more typical operating parameters based at least in part on the verifying; and
notify the user that the one or more configuration parameters do not match the one or more typical operating parameters.

14. The system of claim 8, wherein the instructions are executable by the processor to:
identify an override command based at least in part on the received audible input;
determine if the system component allows an implementation of the identified override command; and
install the system component based at least in part on determining that the system component allows the implementation of the identified override command.

15. A computer-program product for installing, via a processor, a security or automation system, the computer-program product comprising a non-transitory computer-readable medium storing instructions thereon, the instructions being executable by the processor to:
receive an audible input from a user;
identify an installation command associated with a system component and a setting of the system component based at least in part on the received audible input;
determine whether the setting complies with a standard associated with the system component, the standard based at least in part on the installation command; and
determine whether to install the system component based at least in part on determining whether the setting complies with the standard associated with the system component.

16. The computer-program product of claim 15, wherein the instructions are executable by the processor to:
determine that the identified setting of the system component does not comply with the standard; and
generate a notification based at least in part on the determining.

17. The computer-program product of claim 15, wherein the instructions are executable by the processor to:
identify one or more configuration parameters of the system component from the audible input;
compare the one or more configuration parameters with one or more typical operating parameters; and
verify whether the one or more configuration parameters match the one or more typical operating parameters based at least in part on the comparing.

* * * * *